United States Patent [19]
Feinstein et al.

[11] Patent Number: 5,964,535
[45] Date of Patent: Oct. 12, 1999

[54] SLIDE ASSEMBLY FOR PRELOADING ROLLER BEARINGS

[75] Inventors: Alan Feinstein, Commack; Robert Nichols, Rocky Point, both of N.Y.

[73] Assignee: Bayside Controls, Inc., Port Washington, N.Y.

[21] Appl. No.: 09/160,962

[22] Filed: Sep. 25, 1998

Related U.S. Application Data

[62] Division of application No. 08/976,154, Nov. 21, 1997, Pat. No. 5,897,213.

[51] Int. Cl.$^6$ ........................................................ F16C 29/06
[52] U.S. Cl. ................................................................ 384/44
[58] Field of Search ................................... 384/44, 43, 45; 464/168

[56] References Cited

U.S. PATENT DOCUMENTS

| | | | |
|---|---|---|---|
| 4,630,872 | 12/1986 | Teramachi | 384/45 |
| 4,636,094 | 1/1987 | Teramachi | 384/44 |

*Primary Examiner*—Lenard A. Footland
*Attorney, Agent, or Firm*—Collard & Roe, P.C.

[57] ABSTRACT

A machine slide comprising a support member having two longitudinally-extending races with outwardly-facing, longitudinally extending grooves at opposite sides thereof, and a carriage movable on the support member. The carriage has two longitudinally-extending races having inwardly facing, longitudinally-extending grooves. When the carriage is placed on the support member, the grooves of the support member and the grooves of the carriage correspond to define two parallel longitudinally-extending raceways for roller bearings. There are two longitudinally-extending slits forming an island in the bottom surface of the carriage above one of the races on the carriage. A longitudinally-extending groove is located along the outside face of the side wall of the carriage nearest the island. A bearing retainer that regulates the spacing of the roller bearings is mounted within each raceway. At least one adjustment screw is disposed in the outside wall of the carriage nearest the island and extends through the race on the support member. Turning the adjustment screw adjusts the size of the raceways and applies a preload to the bearings. The slits and the longitudinally-extending groove on the carriage allow the carriage to flex and absorb irregular forces during sliding. In an alternative embodiment, the carriage is rigid and the support member has a flexible side wall that can absorb irregular forces.

4 Claims, 3 Drawing Sheets

SLIDE ASSEMBLY FOR PRELOADING ROLLER BEARINGS

This is a divisional of application Ser. No. 08/976,154 filed on Nov. 21, 1997, now U.S. Pat. No. 5,897,213.

BACKGROUND OF THE INVENTION

1. Field of the Invention

This invention relates to a novel linear machine slide. In particular, the invention relates to a design for preloading roller bearings in a linear machine slide to enable frictionless and reproducible operation of the slide.

2. The Prior Art

Preloading of roller bearings in a linear slide is necessary when extremely accurate and lasting performance of the slide is required. Preloading means that the roller bearings are precisely positioned to eliminate side and vertical play, while avoiding friction as well. Such slides are used in machine tools and in inspection and scanning devices in the semiconductor industry, where precise positioning is essential.

Preloading the bearings allows for the slide to be operated at higher speeds and extends its life and cost of operation. The bearings must be mounted to ensure that the preload is evenly distributed over the full length of the raceway. A common method for preload is to apply even amounts of force against an adjustable rail with a set screw in order to obtain a smooth rolling motion and mechanical stiffness.

Various methods are known for preloading roller bearings in slides. For example, U.S. Pat. No. 3,778,121 to Levesque discloses a slide guide having preloaded hollow and solid roller bearings in which the hollow bearings have a diameter slightly larger than the diameter of the bearing surfaces, so that the hollow rollers are compressed between the bearing surfaces. U.S. Pat. No. 3,790,233 to Polidor discloses an antifriction slide assembly in which preload on the rollers is achieved by longitudinal adjustment of a tapered gib having a small wedge angle.

U.S. Pat. No. 5,553,945 to Blaurock et al. discloses a linear guiding apparatus having ball bearings that achieves vibration damping in several ways. One way is to create a slit extending in the moving direction and filling the slit with vibration damping material.

One of the problems with linear machine slides, even when the bearings are precisely preloaded, is that irregularities in the bearing way can detract from the smooth operation of the slide and lead to positioning errors.

It is therefore desirable to construct a linear slide that achieves precise preloading of roller bearings and eliminates movement and vibrations caused by bearing way anomalies, using the spring rate of the carriage housing as a continuously active preload.

SUMMARY OF THE INVENTION

It is therefore an object of the present invention to provide a slide assembly having precisely preloaded roller bearings.

It is another object of the invention to provide a slide assembly that is simple and inexpensive to construct.

It is another object of the present invention to achieve a continuously active preload using the spring rate of the carriage housing, and which eliminates excessive vibrations and errors.

These and other objects and features of the invention are accomplished by a slide assembly comprising a support member and a carriage slidably mounted on the support member. The carriage and support member each have longitudinally-extending races with grooves that mate with each other to define two bearing raceways. A plurality of roller bearings are disposed within the raceways and are spaced with a bearing retainer within each raceway.

In one embodiment of the invention, two vertical slits are cut in the underside of the carriage adjacent one of the races in the carriage. These slits extend through the length of the carriage in the longitudinal direction. The slits define a flexible "island" in the carriage. An adjusting screw extends from the outside surface of the carriage toward the raceway. The slits allow one of the raceways to be adjustable and allow the carriage to flex with inaccuracies in the bearing structure. In addition, bearing way anomalies, which impact linear motion (straightness/flatness) and angular motion (pitch/yaw), are not transmitted directly through the top surface of the carriage, but are absorbed by the slits and allow for smooth, frictionless sliding of the carriage.

Only one side of the carriage is adjustable and flexible. The other side of the carriage remains rigid. This arrangement is optimal because sufficient rigidity of the assembly is necessary to obtain consistent positioning during operation of the slide.

Turning the screw adjusts the position of the raceway to achieve precise preloading of the bearings. In addition, an outwardly-facing longitudinally-extending groove is located on the same side of the carriage and adds additional flexibility to that side of the carriage.

In an alternative embodiment, the flexibility is created by carving out a portion of the inside side wall of the support member underneath the raceway. An adjustment screw extends from the outer surface of the support member in toward the raceway above the carved-out portion. Turning the screw allows for adjustment of the preload. The side wall of the support member flexes at the carved-out portion to absorb any irregularities and enable smooth motion of the slide. This construction reduces errors within the carriage and dramatically enhances the repeatability of errors.

The carriage and support member are preferably constructed of aluminum. The bearings, races and adjustment screw are constructed of steel. This combination of different materials imparts the required stiffness and durability where it is required in the bearings and raceways, but allows for sufficient flexibility in the carriage and support member.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENTS

Figure 1:
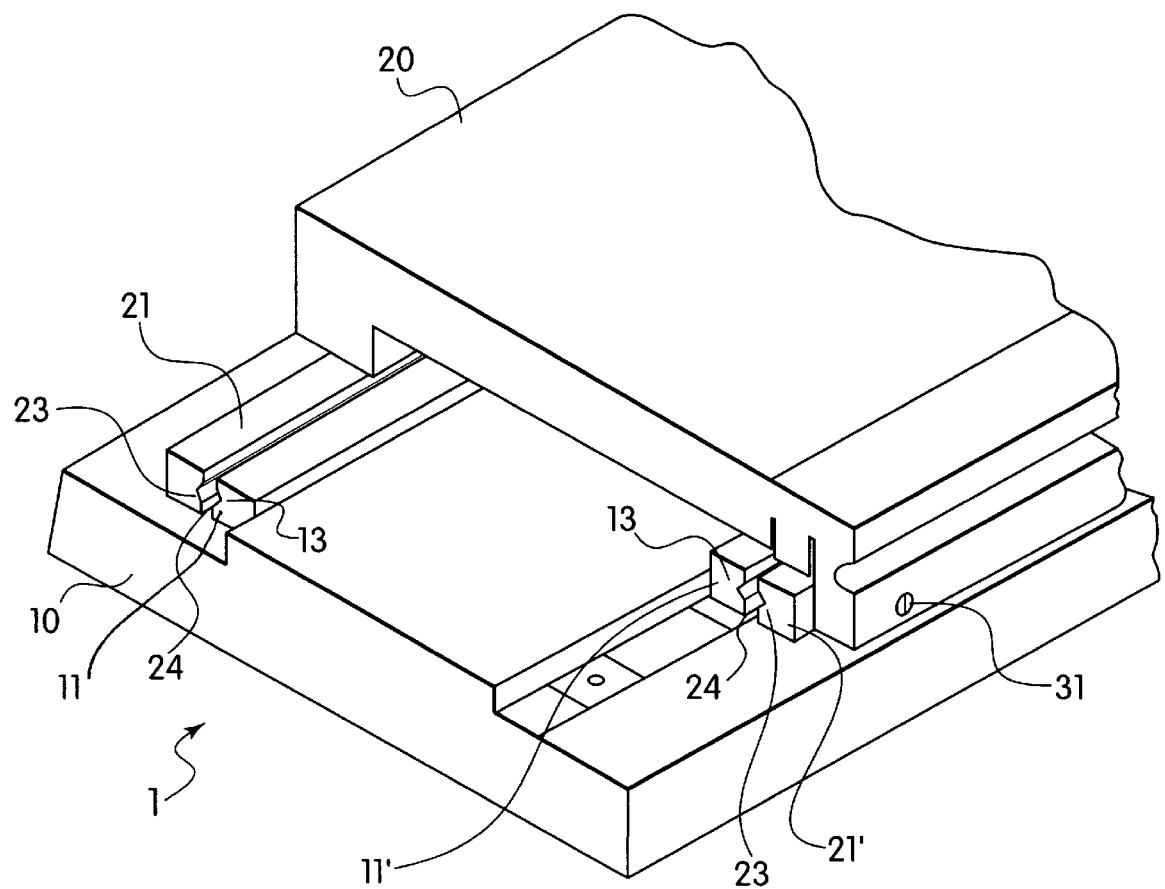
FIG. 1 shows a perspective view of the slide assembly according to the invention.

Referring now in detail to the drawings and, in particular, FIG. 1, there is shown a perspective view of one embodiment of the slide assembly according to the present invention. Assembly 1 includes a support member 10 and a carriage 20 slidably mounted on support member 10. Two steel races 11 and 11' are mounted on support member 10 and extend along the length of support member 10. Races 11 and 11' are mounted to support member 10 with screws 15. Each one of races 11 and 11' has an outwardly-facing groove 13. A second set of steel races 21 and 21' are mounted along the length of carriage 20 with screws 16. Each one of races 21 and 21' has an inwardly-facing groove 23.

Figure 2:
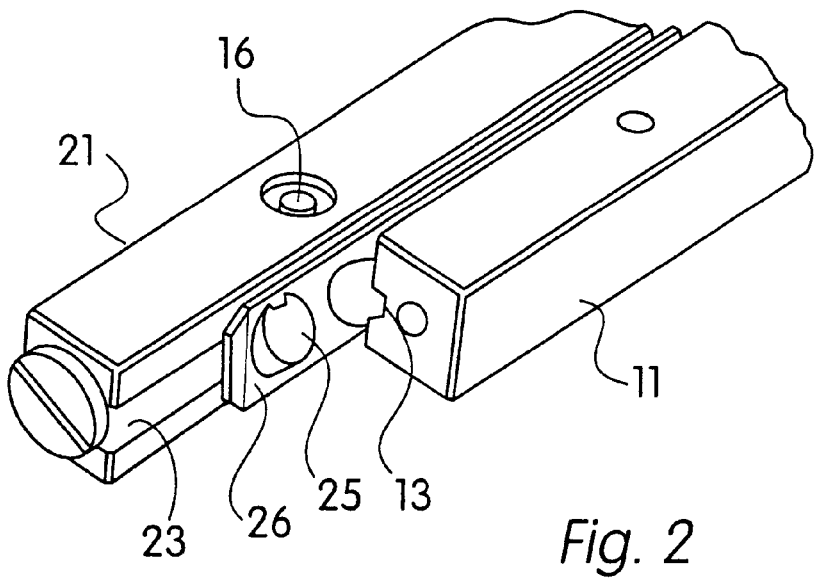
FIG. 2 shows a perspective view of one of the raceways and roller bearings as used in the invention.

Each groove 13 mates with a groove 23 to form a longitudinally-extending raceway 24. A plurality of roller bearings 25 are mounted in a crossed arrangement within each raceway 24, as shown in FIG. 2. Each roller bearing 25 has an axis of rotation that is perpendicular to the axis of rotation of adjacent roller bearings, thus the crossed arrangement. Roller bearings 25 can be solid, hollow or a mixture of both solid and hollow. Roller bearings 25 are mounted in a strip-like bearing retainer 26, which keeps bearings 25 at an even spacing from one another.

Carriage 20 is slid back and forth across support member 10 to accomplish a particular operation, such as to enable scanning semiconductor parts. Bearings 25 roll within raceway 24 and enable the smooth sliding of carriage 20.

Figure 3:
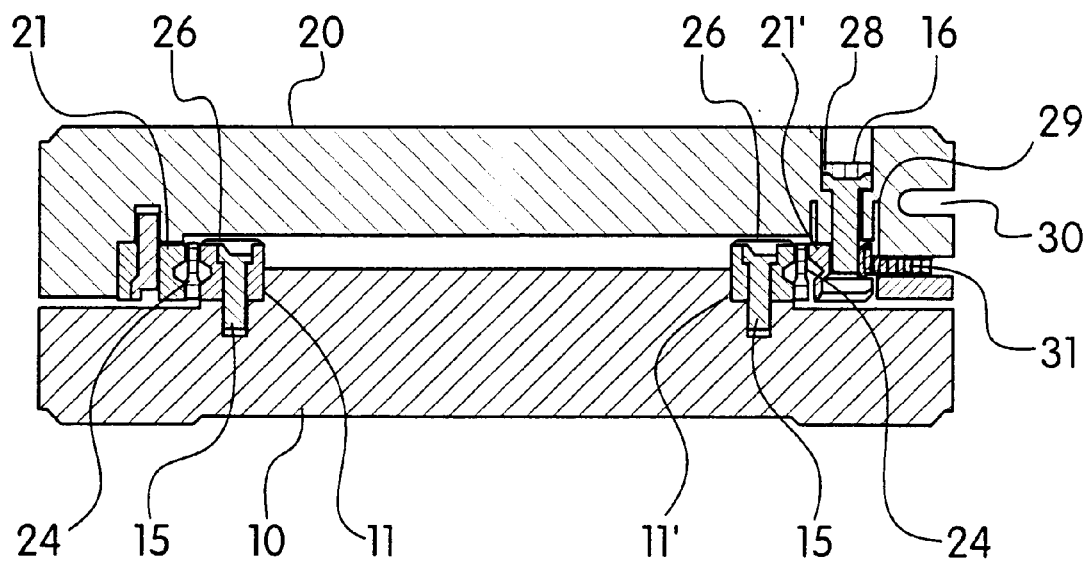
FIG. 3 shows a cross-sectional end view of the slide assembly shown in FIG. 1.

Two slits 28 and 29 are located in carriage 20, immediately above race 21', as shown in FIGS. 1 and 3. Slits 28 and 29 define an "island" where carriage 20 can flex under pressure. A groove 30 is cut into the side of carriage 20 on the same side of carriage 20 as slits 28 and 29 and adds additional flexibility to carriage 20. The other side of carriage 12 remains solid and rigid. Such flexibility is necessary because during sliding of carriage 20, irregularities in the raceway and in the bearings can cause undesirable vibrations and irregular movement of the bearings and thus of the carriage. Slits 28 and 29 and groove 30 can absorb the pressure caused by these irregularities and ensure smooth, reproducible sliding, which is necessary in many high precision fields.

Bearings 25 must have a preload applied to them to ensure smooth sliding without lateral or axial play. To apply a preload, one or more adjustment screws 31 are located on the flexible side of carriage 20 and extend into race 21', as shown in FIG. 3. Turning screw 31 adjusts the position of race 21' with respect to race 11' and thus adjusts the amount of tension on bearings 25 within raceway 24.

Figure 4:
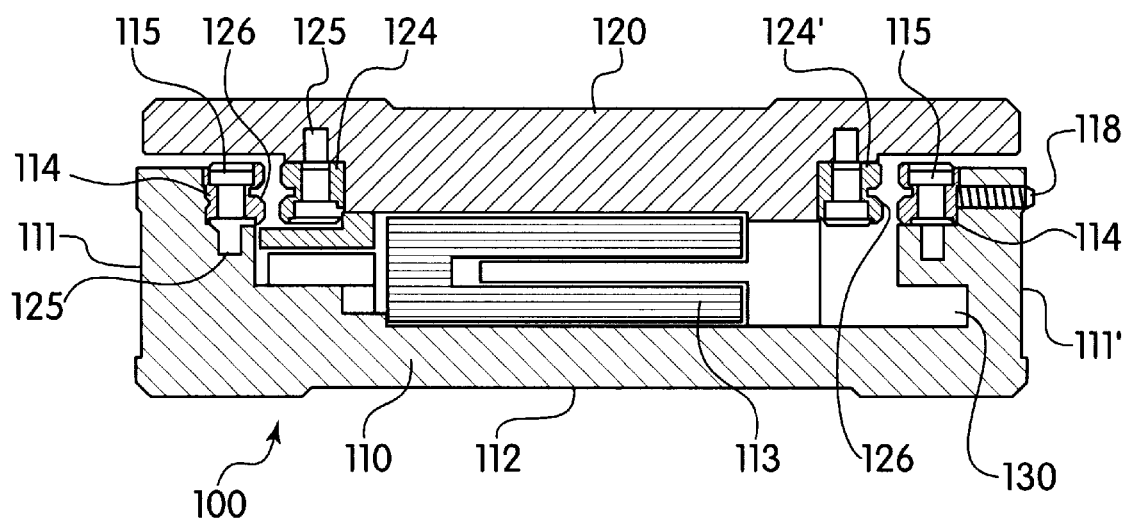
FIG. 4 shows a cross-sectional end view of another embodiment of the slide assembly according to the present invention.

A second embodiment 100 of the invention is shown in FIG. 4. Here, support member 110 is generally U-shaped, having side walls 111 and 111' and a bottom 112. Carriage 120 is flat and is supported above the side walls 111 of support member 110. A linear motor 113 is disposed between support member 110 and carriage 120 to drive assembly 100.

Two steel races 114 and 114' are mounted to side walls 111 and 111' with mounting screws 115. Races 124 and 124' are mounted with mounting screws 125 to carriage 120. Each of races 114, 114', 124 and 124' are fitted with grooves so that two raceways 126 are created when carriage 120 is placed on support member 110. A set of roller bearings can be arranged in raceways 126 in a similar manner as shown in FIGS. 2 and 3.

An adjustment screw 118 extends through side wall 111' and allows the position of race 114' to be adjusted with respect to race 124', to adjust the preload on the bearings.

Side wall 111' has a cavity 130 running the length of support member 110. Cavity 130 relieves the stiffness of side wall 111' and allows it to flex under pressure. Wall 111 remains solid and does not flex. This particular arrangement allows support member 110 to absorb forces caused by irregularities in the raceway and to ensure smooth sliding of carriage 120 on support member 110. Leaving wall 111 solid ensures that the slide 100 retains sufficient rigidity to allow for reproducible positioning and durability.

Accordingly, while only several embodiments of the present invention have been shown and described, it is obvious that many changes and modifications may be made thereunto without departing from the spirit and scope of the invention.

What is claimed is:

1. A machine slide comprising:

a support member having a bottom surface and two side walls, each side wall having an outer surface and an inner surface, and comprising two longitudinally-extending races mounted to the side walls, said races having inwardly-facing, longitudinally extending grooves at opposite sides thereof, wherein a lower portion of the inner surface of one side wall has a longitudinally-extending cavity;

a carriage having a top surface and a bottom surface, said carriage being movable on said support member and comprising two longitudinally-extending races mounted on the bottom surface, each race having an outwardly facing, longitudinally-extending groove, such that when said carriage is placed on said support member, said grooves of said support member and said grooves of said carriage correspond to define two longitudinally-extending raceways for receiving bearings; and at least one adjustment screw disposed in the outside wall of said support member and extending into the race on the support member closest to the cavity on the support member, wherein turning the adjustment screw adjusts the size of the raceway and applies preload to bearings disposed in the raceways, and wherein said longitudinally-extending cavity allows the support member to flex and absorb irregularities during sliding of the carriage.

2. The machine slide according to claim 1, further comprising a plurality of roller bearings arranged within said raceways and a bearing retainer located within each raceway for regulating the spacing of said roller bearings.

3. The machine slide according to claim 2, wherein each roller bearing has an axis of rotation that is perpendicular to the axis of rotation of an adjacent roller bearing.

4. The machine slide according to claim 1, wherein the support member and carriage are made of aluminum.

* * * * *